United States Patent
Takezoe (10) Patent No.: US 8,909,458 B2
(45) Date of Patent: *Dec. 9, 2014

(54) EGR CONTROLLER FOR INTERNAL COMBUSTION ENGINE

(75) Inventor: Hiroyuki Takezoe, Kariya (JP)

(73) Assignee: Denso Corporation, Kariya (JP)

( * ) Notice: Subject to any disclaimer, the term of this patent is extended or adjusted under 35 U.S.C. 154(b) by 536 days.

This patent is subject to a terminal disclaimer.

(21) Appl. No.: 13/283,642

(22) Filed: Oct. 28, 2011

(65) Prior Publication Data

US 2012/0109493 A1    May 3, 2012

(30) Foreign Application Priority Data

Oct. 29, 2010    (JP) .................... 2010-244207

(51) Int. Cl.
| | |
|---|---|
| B60T 7/12 | (2006.01) |
| G05D 1/00 | (2006.01) |
| G06F 7/00 | (2006.01) |
| G06F 17/00 | (2006.01) |
| F02D 41/00 | (2006.01) |
| F02D 41/18 | (2006.01) |
| F02M 25/07 | (2006.01) |

(52) U.S. Cl.
CPC ............ *F02D 41/18* (2013.01); *F02D 41/0072* (2013.01); *F02D 2200/0402* (2013.01); *F02D 2041/001* (2013.01); *F02M 25/07* (2013.01); *Y02T 10/47* (2013.01)
USPC .. 701/108; 701/102; 123/568.11; 123/568.21

(58) Field of Classification Search
CPC ...... Y02T 10/47; Y02T 10/121; F02M 25/06; F02M 25/07; F02M 25/0704; F02M 25/0753; F02M 21/08; F02D 41/0047; F02D 41/0052; F02D 41/005; F02D 41/0065; F02D 41/0072; F02D 41/0077; F02D 41/1445

USPC ............... 701/102, 108; 123/568.11, 568.19, 123/568.21

See application file for complete search history.

(56) References Cited

U.S. PATENT DOCUMENTS

| | | | | |
|---|---|---|---|---|
| 4,279,235 A | * | 7/1981 | Flaig et al. ............... | 123/568.21 |
| 4,924,840 A | * | 5/1990 | Wade ....................... | 123/568.19 |

(Continued)

FOREIGN PATENT DOCUMENTS

| | | |
|---|---|---|
| JP | 2005-009437 | 1/2005 |
| JP | 2008-101626 | 5/2008 |

OTHER PUBLICATIONS

Office Action (2 pages) dated Sep. 11, 2013, issued in corresponding Japanese Application No. 2010-244207 and English translation (2 pages).

(Continued)

*Primary Examiner* — Erick Solis
*Assistant Examiner* — Anthony L Bacon
(74) *Attorney, Agent, or Firm* — Nixon & Vanderhye P.C.

(57) ABSTRACT

By means of an air model, an estimated quantity of an exhaust gas flowing into a cylinder and a target quantity of the exhaust gas are computed. A deviation between the estimated quantity and the target quantity is multiplied by a feedback gain to obtain a feedback correction quantity. A reference opening degree of an EGR valve is defined according to an engine driving condition and the feedback correction quantity is added to the reference opening degree to obtain a command opening degree of the EGR valve. According to the engine driving condition and the deviation between the estimated quantity and the target quantity, a feedback gain is established so that control accuracy and control stability of a feedback control can be ensured.

6 Claims, 5 Drawing Sheets

(56) References Cited

U.S. PATENT DOCUMENTS

| | | | |
|---|---|---|---|
| 6,115,664 A | 9/2000 | Cullen et al. | |
| 6,227,182 B1* | 5/2001 | Muraki et al. | 123/568.21 |
| 6,311,679 B1* | 11/2001 | Druzhinina et al. | 123/568.21 |
| 7,263,428 B2 | 8/2007 | Kobayashi et al. | |
| 7,269,497 B2 | 9/2007 | Schreurs et al. | |
| 7,946,162 B2 | 5/2011 | Vennettilli et al. | |
| 2001/0045209 A1* | 11/2001 | Balekai et al. | 123/568.12 |
| 2002/0189254 A1* | 12/2002 | Shirakawa | 60/602 |
| 2006/0235603 A1* | 10/2006 | Kobayashi et al. | 701/108 |
| 2007/0000473 A1* | 1/2007 | Yamaoka et al. | 123/295 |
| 2012/0097139 A1 | 4/2012 | Takezoe | |

OTHER PUBLICATIONS

U.S. Appl. No. 13/279,548, of Takezoe, filed Sep. 24, 2011.

Office Action (6 pages) dated Nov. 4, 2013, issued in copending U.S. Appl. No. 13/279,548 of Takezoe, filed Oct. 24, 2011.

* cited by examiner

EGR CONTROLLER FOR INTERNAL COMBUSTION ENGINE

CROSS-REFERENCE TO RELATED APPLICATION

This application is based on Japanese Patent Application No. 2010-244207 filed on Oct. 29, 2010, the disclosure of which is incorporated herein by reference.

FIELD OF THE INVENTION

The present invention relates to an EGR controller for an internal combustion engine, which controls an opening degree of an EGR valve adjusting a quantity of recirculated exhaust gas flowing into a cylinder.

BACKGROUND OF THE INVENTION

An internal combustion engine equipped with an EGR system is well known. In the EGR system, a part of exhaust gas emitted from the engine is recirculated into an intake passage through an EGR passage. The quantity of the recirculated exhaust gas is controlled by an EGR valve. U.S. Pat. No. 7,269,497-B2 shows an EGR system in which the quantity of exhaust gas passing through the EGR valve is estimated by means of an EGR valve model and this estimated quantity is filtered to estimate a quantity of the exhaust gas flowing into a cylinder. An opening degree of the EGR valve is feedback controlled in such a manner that the quantity of the exhaust gas flowing into the cylinder agrees with a target value.

JP-2008-101626A shows, in detail, a model for estimating the quantity of the exhaust gas flowing into a cylinder. The quantity of the exhaust gas passing through the EGR valve is computed by means of an EGR valve model which simulates a behavior of the exhaust gas passing through the EGR valve. When the engine is stably running, it is deemed that the quantity of the exhaust gas passing through the EGR valve is equal to the quantity of the exhaust gas flowing into a cylinder. When the engine is in a transitional running condition, the quantity of the exhaust gas flowing into the cylinder is computed based on the quantity of the exhaust gas passing through the EGR valve by means of a EGR diffusion model (time delay+first order lag) which simulates a behavior of the exhaust gas flowing in an intake pipe toward an intake port of the engine.

It should be noted that the opening degree of the EGR valve is feedback controlled in such a manner that the quantity of the exhaust gas passing through the EGR valve agrees with a target value.

In order to improve fuel economy of the engine equipped with an EGR system, it is necessary to control the quantity of the recirculated exhaust gas flowing into a cylinder (or an EGR ratio) according to an engine driving condition so that gas including exhaust gas is efficiently combusted in a cylinder. Thus, it is necessary to feedback control the opening degree of the EGR valve in such a manner that the quantity of the exhaust gas flowing into a cylinder (or an EGR ratio) agrees with the target value with high accuracy.

However, in the EGR system shown in the above two patent documents, it became apparent that a control accuracy of the quantity of the exhaust gas flowing into a cylinder does not satisfy the required accuracy to improve the fuel economy. This reason can be considered as follows:

(1) In the conventional system, it is difficult to obtain high control accuracy and high control stability in the feedback control of an EGR valve.

(2) An accuracy of the model which estimates the quantity of the exhaust gas flowing into a cylinder is not high.

SUMMARY OF THE INVENTION

The present invention is made in view of the above matters, and it is an object of the present invention to provide an EGR controller having high accuracy for controlling an opening degree of an EGR valve, whereby a quantity of recirculated exhaust gas flowing into a cylinder can be accurately controlled.

According to the present invention, an EGR controller includes: an EGR valve controlling a quantity of an exhaust gas recirculated from an exhaust passage into an intake passage through an EGR passage; a measuring means for measuring a quantity of an intake air flowing through the intake passage; an estimating means for estimating a quantity of the exhaust gas flowing into a cylinder of the engine; and an EGR control means for controlling an opening degree of the EGR valve.

Figure 2:
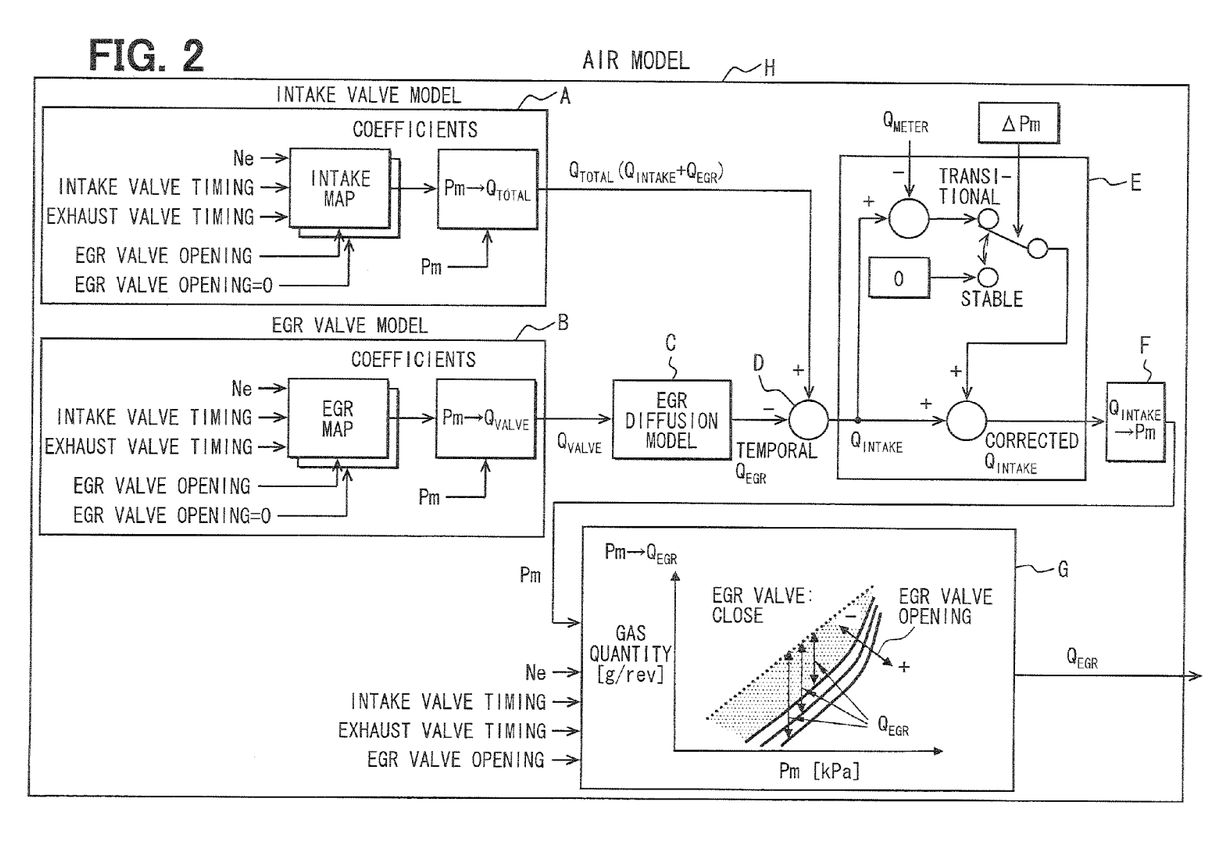
FIG. 2 is a block diagram for explaining an air model for estimating a quantity of recirculated exhaust gas flowing into a cylinder.

The estimating means includes, as shown in FIG. 2, a first means for computing a total quantity of a gas flowing into a cylinder by means of an intake valve model which simulates a behavior of gas flowing through the intake passage toward a cylinder;

a second means for computing a quantity of the exhaust gas passing through the EGR valve by means of an EGR valve model which simulates a behavior of the recirculated exhaust gas passing through the EGR valve;

a third means for computing a temporal quantity of the exhaust gas flowing into the cylinder based on the quantity of the exhaust gas passing through the EGR valve by means of an EGR diffusion model which simulates a behavior of the exhaust gas flowing through the intake passage toward an intake port of the internal combustion engine;

a fourth means for obtaining the quantity of the intake air flowing into the cylinder by subtracting the temporal quantity of the exhaust gas flowing into the cylinder from the total quantity of the gas flowing into the cylinder;

a fifth means for correcting the quantity of the intake air flowing into the cylinder by means of the intake air quantity measured by the measuring means;

a sixth means for computing an intake air pressure based on the quantity of the intake air corrected by the fifth means, and a seventh means for computing a quantity of the recirculated exhaust gas flowing into the cylinder based on at least the intake air pressure.

The EGR control means executes a feedback control of an opening degree of the EGR valve in such a manner that a deviation between a target quantity established according to an engine driving condition and the quantity of the exhaust gas flowing into the cylinder which the estimating means estimates, or a deviation between a target ratio established according to the engine driving condition and an EGR ratio which is computed based on the quantity of the exhaust gas flowing into the cylinder becomes smaller.

The estimating means computes a total quantity of gas flowing into a cylinder by means of an intake valve model. A temporal quantity of the exhaust gas flowing into the cylinder is computed by means of an EGR valve model and an EGR diffusion model. After that, the quantity of the intake air flowing into the cylinder is obtained by subtracting the temporal quantity of the exhaust gas flowing into the cylinder from the total quantity of the gas flowing into the cylinder.

Further, the computed quantity of the intake air is corrected by means of the intake air quantity measured by the measuring means. An intake air pressure is computed based on the corrected quantity of the intake air. Then, a quantity of the recirculated exhaust gas flowing into the cylinder is computed based on at least the intake air pressure.

Thus, the quantity of the recirculated exhaust gas can be computed with high accuracy based on the exhaust gas quantity which the measuring means measures. A combustibility of air fuel mixture is improved and emission can be reduced.

BRIEF DESCRIPTION OF THE DRAWINGS

Other objects, features and advantages of the present invention will become more apparent from the following description made with reference to the accompanying drawings, in which like parts are designated by like reference numbers and in which.

DETAILED DESCRIPTION OF EMBODIMENTS

An embodiment of the present invention, which is applied to an internal combustion engine equipped with a turbocharger, will be described hereinafter.

Figure 1:
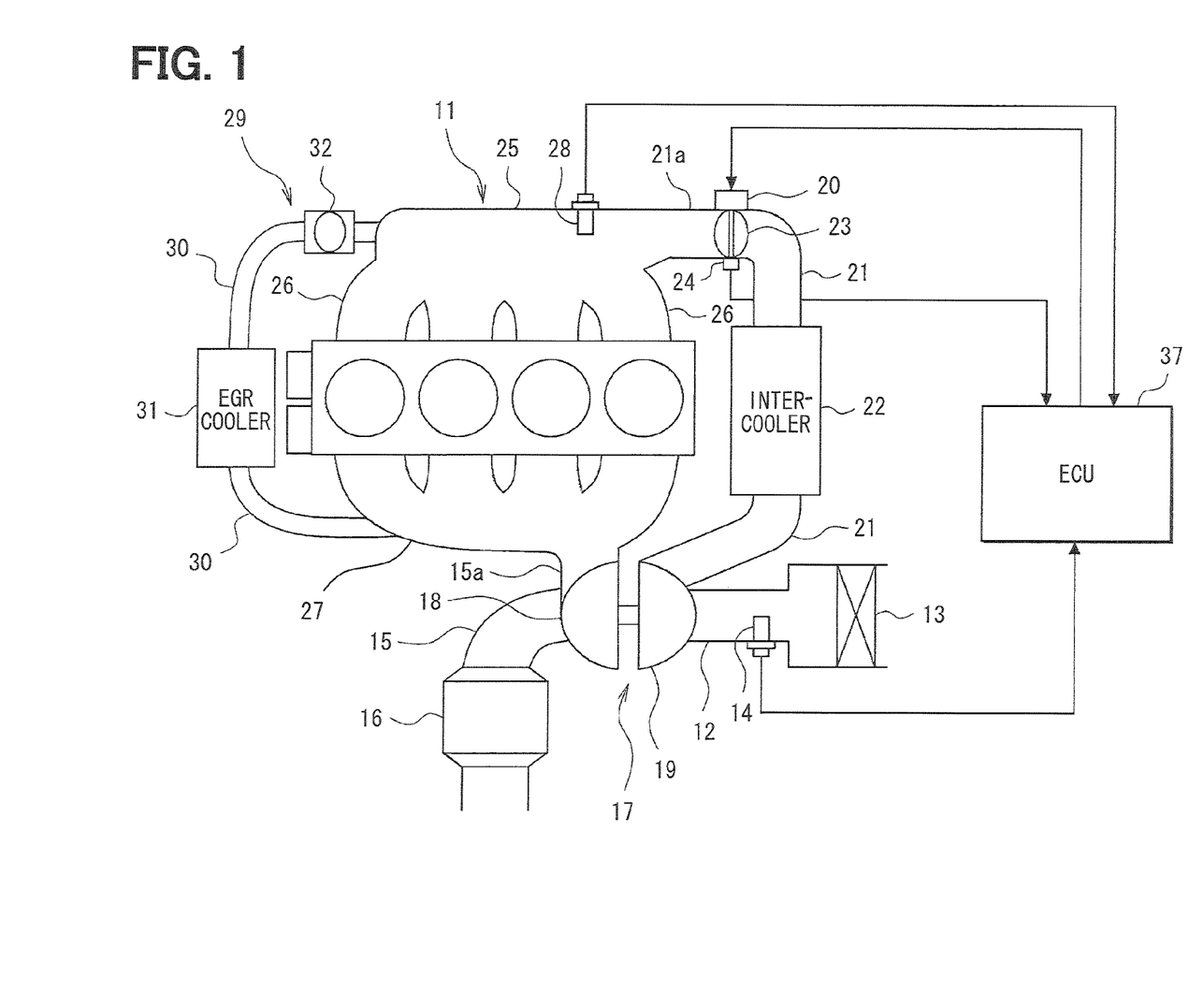
FIG. 1 is a schematic view of an engine control system with a turbocharger according to an embodiment of the present invention.

Referring to FIG. 1, an engine control system will be schematically explained. An air cleaner 13 is arranged upstream of an intake pipe 12 (intake passage) of an internal combustion engine 11. An airflow meter 14 detecting an intake air flow rate is provided downstream of the air cleaner 13. An exhaust pipe 15 (exhaust passage) of the engine 11 is provided with a three-way catalyst 16 which reduces CO, HC, NOx, and the like contained in exhaust gas.

The engine 11 is provided with the turbocharger 17. The turbocharger 17 includes an exhaust gas turbine 18 arranged upstream of the catalyst 16 in the exhaust pipe 15 and a compressor 19 arranged downstream of the airflow meter 14 in the intake pipe 12. This turbocharger 17 has well known configuration which supercharges the intake air into the combustion chamber.

An intercooler 22 cooling the intake air is provided in the intake pipe 21 downstream of the compressor 19. A throttle valve 23 driven by a DC-motor 20 and a throttle position sensor 24 detecting a throttle position are provided downstream of the intercooler 22.

A surge tank 25 is connected to an intake pipe 21a downstream of the throttle valve 23. An intake manifold 26 which introduces air into each cylinder of the engine 11 is provided downstream of the surge tank 25, and a fuel injector (not shown) which injects fuel is provided for each cylinder. An intake air pressure sensor 28 detecting intake air pressure Pm is provided in the surge tank 25. A spark plug (not shown) is mounted on a cylinder head of the engine 11 corresponding to each cylinder to ignite air-fuel mixture in each cylinder.

An exhaust manifold 27 (exhaust passage) is connected to each exhaust port of the cylinder. A confluent portion of the exhaust manifold 27 is connected to the exhaust pipe 15a upstream of the exhaust gas turbine 18. Between the exhaust passage 15a, 27 upstream of the exhaust gas turbine 18 and the intake passage 21a, 25, 26 downstream of the throttle valve 23, an EGR pipe 30 of the EGR system 29 is provided in order to recirculate a part of exhaust gas into the intake passage downstream of the throttle valve 23. An EGR cooler 31 cooling the recirculated exhaust gas and an EGR valve 32 controlling the quantity of the recirculated exhaust gas flowing into the intake passage are provided in the EGR pipe 30. An opening degree of the EGR valve 32 is adjusted by a motor (not shown).

Also, the engine 11 is provided with a variable valve timing controller (not shown) which adjusts valve timings of an intake valve and an exhaust valve. A crank angle sensor (not shown) is provided on a cylinder block to output crank angle pulses when a crank shaft rotates a predetermined angle. Based on this crank angle pulses, a crank angle and an engine speed Ne are detected.

The outputs from the above sensors are inputted into an electronic control unit 37, which is referred to an ECU 37 hereinafter. The ECU 37 detects engine driving condition based on the outputs of the sensors. When the engine driving condition is a specified condition to perform an EGR control, the ECU 37 opens the EGR valve 32, whereby a part of exhaust gas is recirculated into the intake passage downstream of the throttle valve 23. At this moment, the ECU 37 executes an EGR quantity computing program, which will be described later referring to FIG. 4, so that a function of each unit "A" to "G" of an air model "H" shown in FIG. 2 is realized. And, the quantity of the exhaust gas flowing into a cylinder is commuted. The quantity of the recirculated exhaust gas flowing into the cylinder is denoted by "$Q_{EGR}$", hereinafter. The function of each unit "A" to "G" of the air model 2H" will be described hereinafter.

[First Unit "A"]

A first unit "A" computes "$Q_{TOTAL}$" ($=Q_{INTAKE}+Q_{EGR}$) by means of an intake valve model which simulates a behavior of the intake air flowing into a cylinder with the recirculated exhaust gas. It should be noted that "$Q_{TOTAL}$" represents a total quantity of gas flowing into the cylinder and "$Q_{INTAKE}$" represents a quantity of intake air flowing into the cylinder.

The intake valve model is approximated by a following formula (1) of which input parameters are an estimated intake air pressure Pm, coefficients $A_0$, $A_1$, and $A_2$.

$$Q_{TOTAL}=A_2\times Pm^2+A_1\times Pm+A_0 \qquad (1)$$

The coefficients $A_0$, $A_1$, $A_2$ are computed based on an intake air characteristic map which is previously defined by simulations or experiments. The intake air characteristic map is comprised of a plurality of maps which is defined at every opening degree of the EGR valve 32. The coefficients $A_0$, $A_1$, $A_2$ are defined for every opening degree of the EGR valve 32. The estimated intake air pressure Pm is computed by means of an intake pipe model. The details of the intake pipe model are described in JP-2008-101626A.

[Second Unit "B"]

A second unit "B" computes the quantity of the exhaust gas passing through the EGR valve 32 by means of an EGR valve model which simulates a behavior of the recirculated exhaust gas passing through the EGR valve 32. The quantity of the exhaust gas passing through the EGR valve 32 is denoted by "$Q_{VALVE}$", hereinafter.

The EGR valve model is approximated by a following formula (2) of which input parameters are an estimated intake air pressure Pm, coefficients $B_0$, $B_1$, and $B_2$.

$$Q_{VALVE}=B_2\times Pm^2 B_1\times Pm+B_0 \qquad (2)$$

The coefficients $B_0$, $B_1$, $B_2$ are computed based on an EGR characteristic map which is previously defined by simulations or experiments. The EGR characteristic map is comprised of a plurality of maps which is defined at every opening degree of the EGR valve 32. The coefficients $B_0$, $B_1$, $B_2$ are defined for every opening degree of the EGR valve 32. The estimated intake air pressure Pm is computed by means of the above intake pipe model.

[Third Unit "C"]

A third unit "C" computes a temporal "$Q_{EGR}$" based on "$Q_{VALVE}$" by means of an EGR diffusion model which simulates a behavior of the exhaust gas flowing in an intake pipe toward an intake port of the engine. The EGR diffusion model is approximated by "time delay+first order lag".

[Fourth Unit "D"]

A fourth unit "D" subtracts the above temporal "$Q_{EGR}$" from "$Q_{TOTAL}$" computed by the first unit "A" in order to obtain "$Q_{INTAKE}$".

$$Q_{INTAKE} = Q_{TOTAL} - \text{Temporal } Q_{EGR} \quad (3)$$

[Fifth Unit "E"]

A fifth unit "E" corrects the computed "$Q_{INTAKE}$" by means of intake air quantity measured by the airflow meter 14. Specifically, the fifth unit "E" has a switching means which switches the correction quantity "$Q_C$" of "$Q_{INTAKE}$" between for stable driving condition and for transitional driving condition. When a variation $\Delta Pm$ in the estimated intake air pressure Pm per unit time is not greater than a specified value, it is determined that the engine 11 is in the stable driving condition. When the variation $\Delta Pm$ is greater than the specified value, it is determined that the engine 11 is in the transitional driving condition.

When the engine is in the transitional driving condition, the correction quantity "$Q_C$" of "$Q_{INTAKE}$" is set to a differential value between the computed "$Q_{INTAKE}$" and the measured intake air quantity measured by the airflow meter 14. The measured intake air quantity is denoted by "$Q_{METER}$", hereinafter.

$$Q_C = Q_{INTAKE} - Q_{METER} \quad (4)$$

$$\text{Corrected } Q_{INTAKE} = Q_{INTAKE} + Q_C = Q_{INTAKE}(Q_{INTAKE} - Q_{METER}) \quad (5)$$

When the engine is in the stable condition, "$Q_C$" is set to zero. Therefore, when the engine is in the stable condition, "$Q_{INTAKE}$" computed by the fourth unit "D" is used without any correction.

[Sixth Unit "F"]

A sixth unit "F" computes an estimated intake air pressure Pm based on "$Q_{INTAKE}$" corrected by the fifth unit "E", by means of an inverse model of the intake valve model which is used in the first unit "A".

[Seventh Unit "G"]

A seventh unit "G" computes "$Q_{EGR}$" based on the estimated intake air pressure Pm, an engine speed Ne, an intake valve timing, an exhaust valve timing, and the opening degree of the EGR valve 32, by means of the EGR valve model.

Figure 3:
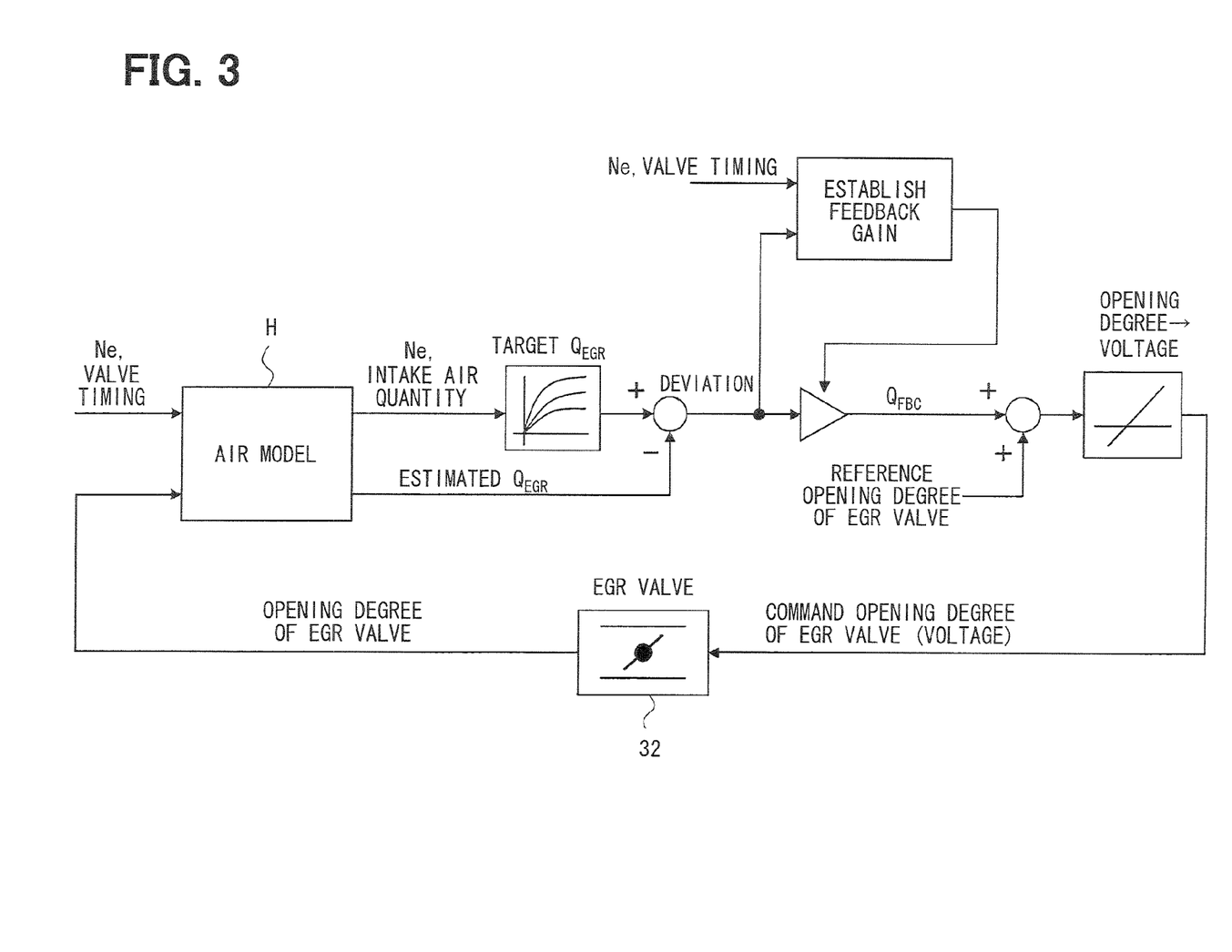
FIG. 3 is a block diagram for explaining an EGR feedback control system.
Figure 4:
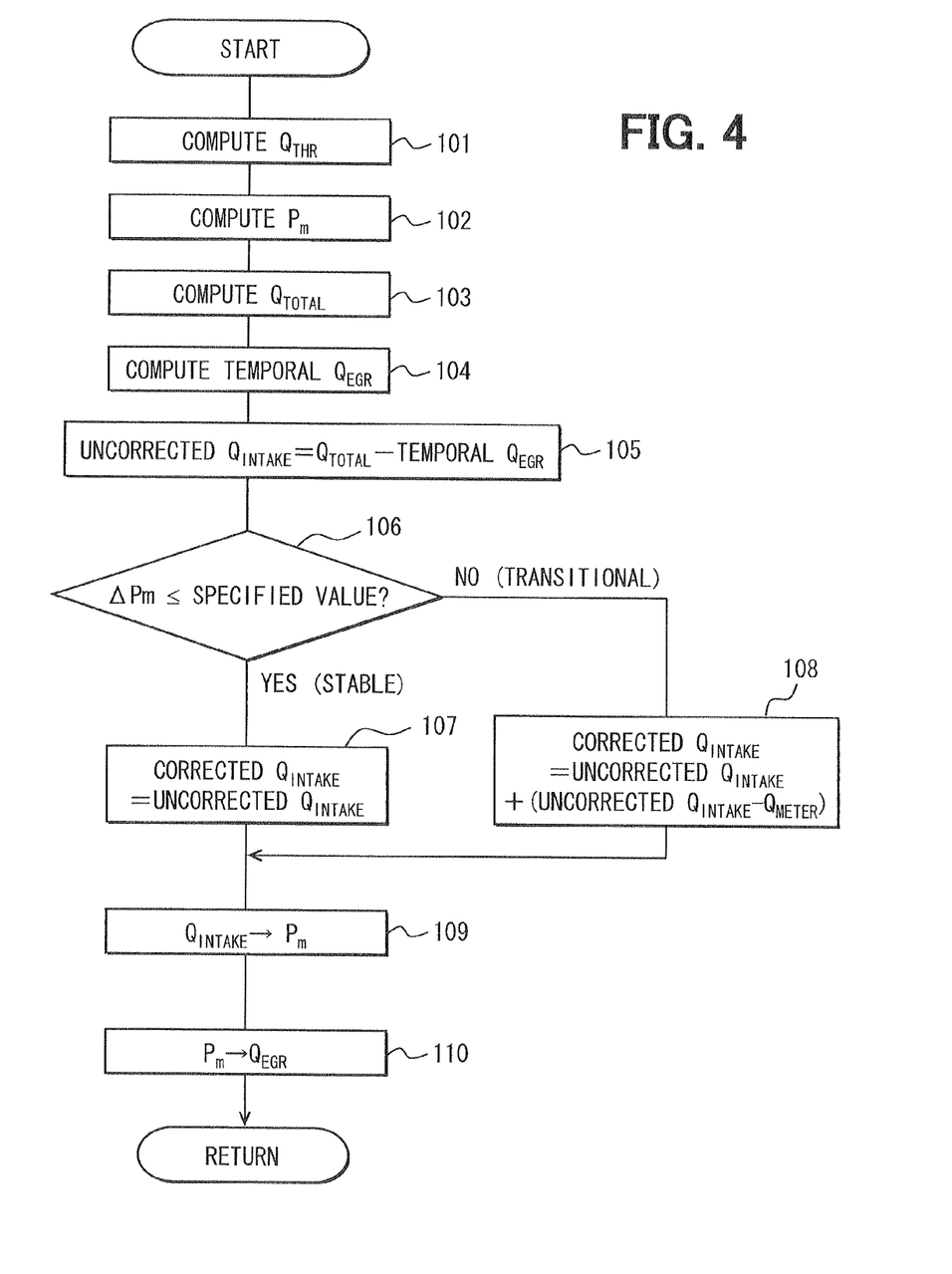
FIG. 4 is a flowchart showing a processing for computing a quantity of recirculated exhaust gas flowing into a cylinder.

The ECU 37 executes an EGR quantity computing program of which processing is shown FIG. 4, whereby the above functions of the first to the seventh unit "A" to "G" of the air model "H" are realized. Furthermore, the ECU 37 feedback controls an opening degree of the EGR valve 32 by means of $Q_{EGR}$-Feedback-control system shown in FIG. 3.

In the $Q_{EGR}$-Feedback-control system of the present embodiment, "$Q_{EGR}$" is computed by means of the air model "H" and a target "$Q_{EGR}$" is computed according to an engine driving condition, such as engine speed and intake air quantity. Then, a deviation between "$Q_{EGR}$" and the target "$Q_{EGR}$" is multiplied by a feedback gain to obtain a feedback correction quantity "$Q_{FBC}$". A reference opening degree of the EGR valve 32 is established according to the engine driving condition. "$Q_{FBC}$" is added to the reference opening degree of the EGR valve 32 to obtain a command opening degree of the EGR valve 32. This command opening degree is converted into voltage which is applied to the motor driving the EGR valve 32, whereby the opening degree of the EGR valve 32 is brought into the command opening degree. The opening degree of the EGR valve 32 detected by an EGR valve position sensor (not shown) is fed back to the air model "H", whereby the opening degree of the EGR valve 32 is controlled in such a manner that the deviation between "$Q_{EGR}$" and the target "$Q_{EGR}$" becomes smaller.

Alternatively, an EGR ratio is computed based on "$Q_{EGR}$" which the air model "H" estimates, and the opening degree of the EGR valve 32 is controlled in such a manner that the deviation between "$Q_{EGR}$" and the target "$Q_{EGR}$" becomes smaller.

$$\text{EGR ratio} = Q_{EGR} / Q_{TOTAL} \quad (6)$$

$$= Q_{EGR} / (Q_{INTAKE} + Q_{EGR})$$

It should be noted that "$Q_{TOTAL}$" represents a total quantity of gas flowing into the cylinder and "$Q_{INTAKE}$" represents a quantity of intake air flowing into the cylinder.

The feedback gain may be a predetermined constant value. According to the present embodiment, the feedback gain is established according to the engine driving condition and the deviation between "$Q_{EGR}$" and the target "$Q_{EGR}$" in order to improve the accuracy and the stability of the feedback control. Specifically, a map defining a relationship between the deviation, the engine driving condition and the feedback gain is previously formed by simulations or experiments. Based on this map, the feedback gain is computed.

Figure 5:
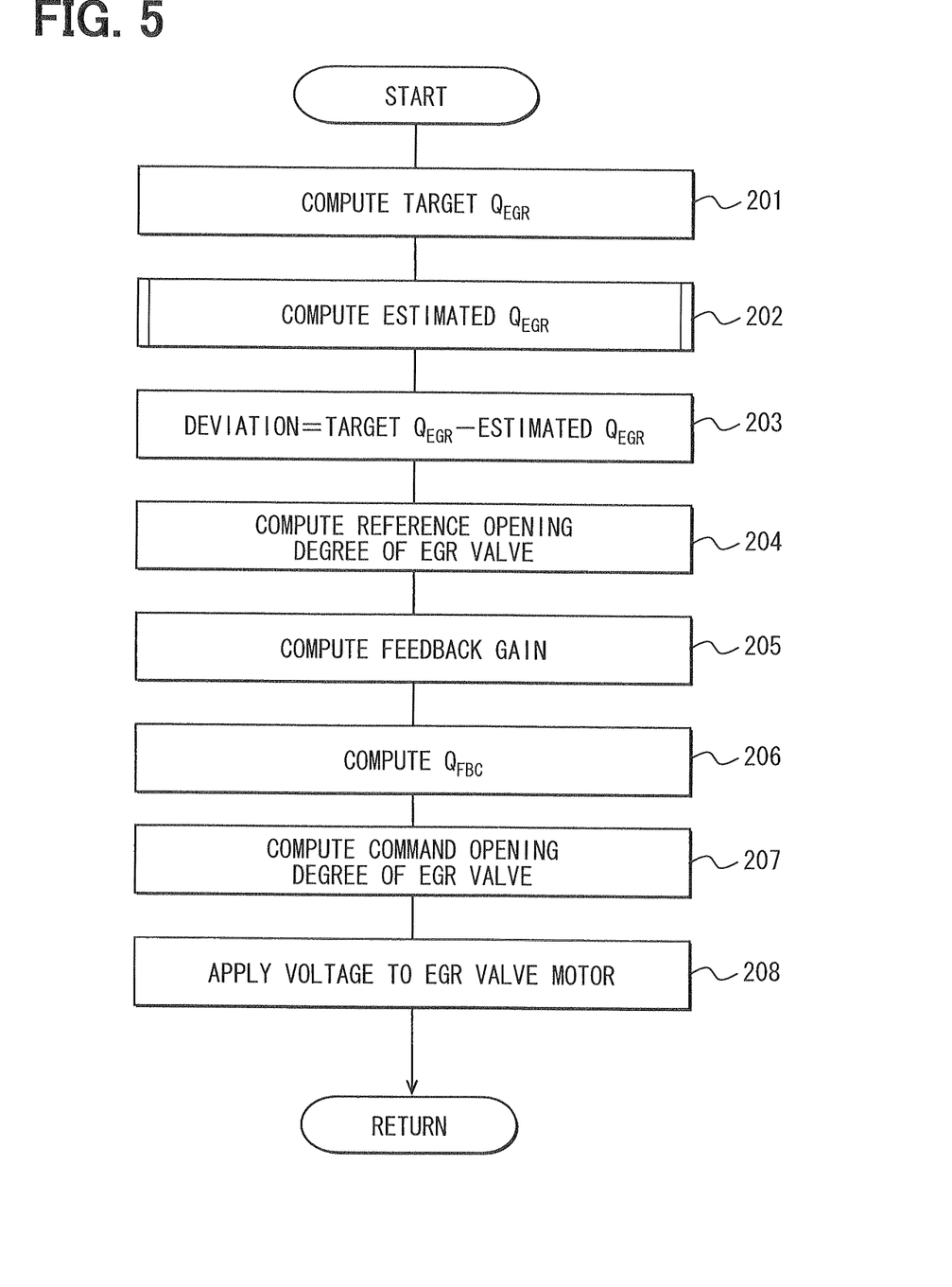
FIG. 5 is a flowchart showing a processing of an EGR quantity feedback control program.

The above described feedback control is executed by the ECU 37 according to processings shown in FIGS. 4 and 5,

[EGR Quantity Computing Program]

An EGR quantity computing program of which processing is shown in FIG. 4 is a sub-routine executed in step 202 of FIG. 5. This program corresponds to an exhaust gas quantity estimating means of the present invention.

In step 101, the ECU 37 computes the quantity of intake air passing through the throttle valve 23, which is denoted by "$Q_{THR}$", based on the throttle opening detected by the throttle position sensor 24 by means of a throttle model which simulates the behavior of the intake air passing through the throttle valve 23. The details of the throttle model are described in JP-2008-101626A.

In step 102, the estimated intake air pressure Pm is computed by means of the intake pipe model. In step 103, "$Q_{TOTAL}$" is computed by means of the intake valve model of the first unit "A".

In step 104, the temporal "$Q_{EGR}$" is computed by means of the EGR valve model of the second unit "B" and the EGR diffusion model of the third unit "C". In step 105, "$Q_{INTAKE}$" of before correction is obtained by subtracting the temporal "$Q_{EGR}$" computed in step 104 from "$Q_{TOTAL}$" computed in step 103.

$$\text{Uncorrected } Q_{INTAKE} = Q_{TOTAL} - \text{Temporal } Q_{EGR} \quad (7)$$

Then, the procedure proceeds to step 106 in which the ECU 37 determines whether the variation *Pm (absolute value) in the estimated intake air pressure Pm is less than or equal to the specified value. When the answer is YES in step 106, the procedure proceeds to step 107 in which "QC" is set to zero and "$Q_{INTAKE}$" of before correction is defined as the corrected "$Q_{INTAKE}$".

$$\text{Corrected } Q_{INTAKE} = \text{Uncorrected } Q_{INTAKE} \quad (8)$$

When the answer is NO in step 106, the procedure proceeds to step 108 in which "QINTAKE" is corrected.

$$\begin{aligned}\text{Corrected } Q_{INTAKE} &= \text{Uncorrected } Q_{INTAKE} + Q_C \quad (9)\\ &= \text{Uncorrected } Q_{INTAKE} +\\ &\quad (\text{Uncorrected } Q_{INTAKE} - Q_{METER})\end{aligned}$$

Then, the procedure proceeds to step 109 in which the estimated intake air pressure Pm is computed based on the corrected "$Q_{INTAKE}$" by means of the inverse model of the intake valve model. Then, the procedure proceeds to step 110 in which an estimated "$Q_{EGR}$" is computed based on the pressure Pm, the engine speed Ne, the intake valve timing, the exhaust valve timing, and the opening degree of the EGR valve 32, by means of the EGR valve model.

[EGR Quantity Feedback Control Program]

An EGR quantity feedback control program of which procedure is shown in FIG. 5 is executed at specified time intervals while the engine is running. This program corresponds to an EGR control means of the present invention. In step 201, the target "$Q_{EGR}$" is computed according to an engine driving condition by use of a map. In step 202, the EGR quantity computing program is executed to compute the estimated "$Q_{EGR}$".

Then, the procedure proceeds to step 204 in which the reference opening degree of the EGR valve 32 is computed according to the engine driving condition in view of the map. In step 205, the feedback gain is computed according to the engine driving condition and the deviation between the target "$Q_{EGR}$" and the estimated "$Q_{EGR}$" in view of the map. It should be noted that the feedback gain may be established according to only the deviation. Alternatively, the feedback gain may be a predetermined constant value.

In step 206, the deviation is multiplied by the feedback gain to obtain "$Q_{FBC}$" relative to the reference opening degree of the EGR valve 32.

$$Q_{FBC} = \text{Deviation} \times \text{Feedback Gain} \quad (10)$$

Then, the procedure proceeds to step 207 in which the command opening degree of the EGR valve 32 is obtained by adding "$Q_{FBC}$" to the reference opening degree.

$$\text{Command Opening Degree} = \text{Reference Opening Degree} + Q_{FBC} \quad (11)$$

Then, the procedure proceeds to step 208 in which the voltage corresponding to the command opening degree is applied to the motor driving the EGR valve 32, whereby the opening degree of the EGR valve 32 agrees with the command opening degree.

According to the above embodiment, since the feedback gain is established according to at least the deviation between the estimated "$Q_{EGR}$" and the target "$Q_{EGR}$", the feedback gain can be set larger as long as the stability of the feedback control is ensured. Therefore, both the accuracy and the stability of the feedback control can be improved, whereby the control accuracy of "$Q_{EGR}$" can be improved.

Further, since the feedback gain is established also according to the engine driving condition, both the accuracy and the stability of the feedback control can be ensured even if the engine driving condition is suddenly changed.

Furthermore, since the computed value of "$Q_{INTAKE}$" is corrected by means of "$Q_{METER}$", the computing accuracy of "$Q_{EGR}$" can be improved.

The model for computing "$Q_{EGR}$" is not limited to the air model "H" shown in FIG. 2. For example, the model described in shown in JP-2008-101626A can be used. Also in this case, the feedback gain is established according to at least the deviation.

The present invention can be applied to an engine having a supercharger and an engine having no supercharger. Especially, in a case that the present invention is applied to an engine equipped with a supercharger, it is restricted that a knocking occurs. A combustibility of air fuel mixture is improved and emission can be reduced.

What is claimed is:

1. An EGR controller for an internal combustion engine, comprising:
    an EGR valve controlling a quantity of an exhaust gas recirculated from an exhaust passage into an intake passage through an EGR passage;
    a measuring means for measuring a quantity of an intake air flowing through the intake passage;
    an estimating means for estimating a quantity of the exhaust gas flowing into a cylinder of the engine; and
    an EGR control means for controlling an opening degree of the EGR valve,
    wherein the estimating means includes:
    a first means for computing a total quantity of a gas flowing into a cylinder by means of an intake valve model which simulates a behavior of gas flowing through the intake passage toward a cylinder;
    a second means for computing a quantity of the exhaust gas passing through the EGR valve by means of an EGR valve model which simulates a behavior of the recirculated exhaust gas passing through the EGR valve;
    a third means for computing a temporal quantity of the exhaust gas flowing into the cylinder based on the quantity of the exhaust gas passing through the EGR valve by means of an EGR diffusion model which simulates a behavior of the exhaust gas flowing through the intake passage toward an intake port of the internal combustion engine;
    a fourth means for obtaining the quantity of the intake air flowing into the cylinder by subtracting the temporal quantity of the exhaust gas flowing into the cylinder from the total quantity of the gas flowing into the cylinder;
    a fifth means for correcting the quantity of the intake air flowing into the cylinder by means of the intake air quantity measured by the measuring means;
    a sixth means for computing an intake air pressure based on the quantity of the intake air corrected by the fifth means, and
    a seventh means for computing a quantity of the recirculated exhaust gas flowing into the cylinder based on at least the intake air pressure, further wherein
    the EGR control means executes a feedback control of an opening degree of the EGR valve in such a manner that a deviation between a target quantity established according to an engine driving condition and the quantity of the exhaust gas flowing into the cylinder which the estimating means estimates becomes smaller.

2. An EGR controller for an internal combustion engine according to claim 1, wherein the EGR control means includes a means for establishing a feedback gain according to at least the deviation.

3. An EGR controller for an internal combustion engine, according to claim 2, wherein
the EGR control means establishes the feedback gain also in view of a driving condition of the internal combustion engine.

4. An EGR controller for an internal combustion engine, according to claim 1, wherein
the EGR control means includes:
a means for defining a reference opening degree of the EGR valve according to a driving condition of the internal combustion engine, and
a means for obtaining a command opening degree of the EGR valve by adding a correction quantity to the reference opening degree of the EGR valve.

5. An EGR controller for an internal combustion engine according to claim 1, wherein the internal combustion engine is equipped with a supercharger.

6. An EGR controller for an internal combustion engine, comprising:
an EGR valve controlling a quantity of an exhaust gas recirculated from an exhaust passage into an intake passage through an EGR passage;
a measuring means for measuring a quantity of an intake air flowing through the intake passage;
an estimating means for estimating a quantity of the exhaust gas flowing into a cylinder of the engine; and
an EGR control means for controlling an opening degree of the EGR valve, wherein
the estimating means includes:
a first means for computing a total quantity of a gas flowing into a cylinder by means of an intake valve model which simulates a behavior of gas flowing through the intake passage toward a cylinder;
a second means for computing a quantity of the exhaust gas passing through the EGR valve by means of an EGR valve model which simulates a behavior of the recirculated exhaust gas passing through the EGR valve;
a third means for computing a temporal quantity of the exhaust gas flowing into the cylinder based on the quantity of the exhaust gas passing through the EGR valve by means of an EGR diffusion model which simulates a behavior of the exhaust gas flowing through the intake passage toward an intake port of the internal combustion engine;
a fourth means for obtaining the quantity of the intake air flowing into the cylinder by subtracting the temporal quantity of the exhaust gas flowing into the cylinder from the total quantity of the gas flowing into the cylinder;
a fifth means for correcting the quantity of the intake air flowing into the cylinder by means of the intake air quantity measured by the measuring means;
a sixth means for computing an intake air pressure based on the quantity of the intake air corrected by the fifth means, and
a seventh means for computing a quantity of the recirculated exhaust gas flowing into the cylinder based on at least the intake air pressure, further wherein
the EGR control means executes a feedback control of an opening degree of the EGR valve in such a manner that a deviation between a target ratio established according to the engine driving condition and an EGR ratio which is computed based on the quantity of the exhaust gas flowing into the cylinder becomes smaller.

* * * * *